United States Patent
Hammes et al.

(10) Patent No.: US 12,181,596 B2
(45) Date of Patent: *Dec. 31, 2024

(54) SAFETY SYSTEM AND METHOD USING A SAFETY SYSTEM

(71) Applicant: Sick AG, Waldkirch (DE)

(72) Inventors: Markus Hammes, Waldkirch (DE); Carsten Natzkowski, Waldkirch (DE)

(73) Assignee: SICK AG, Waldkirch (DE)

( * ) Notice: Subject to any disclaimer, the term of this patent is extended or adjusted under 35 U.S.C. 154(b) by 339 days.

This patent is subject to a terminal disclaimer.

(21) Appl. No.: 17/579,940

(22) Filed: Jan. 20, 2022

(65) Prior Publication Data
US 2022/0229148 A1    Jul. 21, 2022

(30) Foreign Application Priority Data

Jan. 21, 2021    (DE) .......................... 102021101180.9

(51) Int. Cl.
*G01S 5/02*    (2010.01)

(52) U.S. Cl.
CPC ........ *G01S 5/02216* (2020.05); *G01S 5/0231* (2013.01)

(58) Field of Classification Search
CPC ........................... G01S 5/02216; G01S 5/0231
USPC ..................................................... 455/404.2
See application file for complete search history.

(56) References Cited

U.S. PATENT DOCUMENTS

| | | | |
|---|---|---|---|
| 5,774,876 A | 6/1998 | Woolley et al. | |
| 7,636,061 B1* | 12/2009 | Thomas | G01S 5/10 342/464 |
| 8,345,653 B2* | 1/2013 | Shoarinejad | H04W 88/08 455/456.1 |
| 8,648,709 B2 | 2/2014 | Gauger et al. | |
| 10,966,059 B1* | 3/2021 | Dayal | H04W 4/023 |
| 2006/0132303 A1* | 6/2006 | Stilp | G05B 15/02 340/508 |
| 2011/0135149 A1* | 6/2011 | Gefen | G01S 3/7864 382/103 |
| 2011/0315765 A1 | 12/2011 | Schantz et al. | |
| 2012/0095678 A1* | 4/2012 | Moore | G01C 21/206 701/434 |
| 2014/0266609 A1* | 9/2014 | Yang | G06K 7/10366 340/8.1 |
| 2015/0271643 A1* | 9/2015 | Jalali | G06K 7/10009 455/456.1 |

(Continued)

FOREIGN PATENT DOCUMENTS

EP    3828584 A1    6/2021

*Primary Examiner* — Huy C Ho
(74) *Attorney, Agent, or Firm* — Nath, Goldberg & Meyer; Jerald L. Meyer

(57) ABSTRACT

A method using a safety system and a safety system for localizing at least one object, with varying locations, are provided. A radio location system has at least three arranged radio stations and at least one radio transponder is arranged at the object. Position data of the radio transponder and the object can be determined by means of the radio location system. The position data can be transmitted from a radio station of the radio location system to a control and evaluation unit which is configured to cyclically detect the position data of the radio transponder. A first inspection unit is connected to the control and evaluation unit, and the control and evaluation unit is checked by the first inspection unit.

16 Claims, 5 Drawing Sheets

(56) References Cited

U.S. PATENT DOCUMENTS

Figure 1:
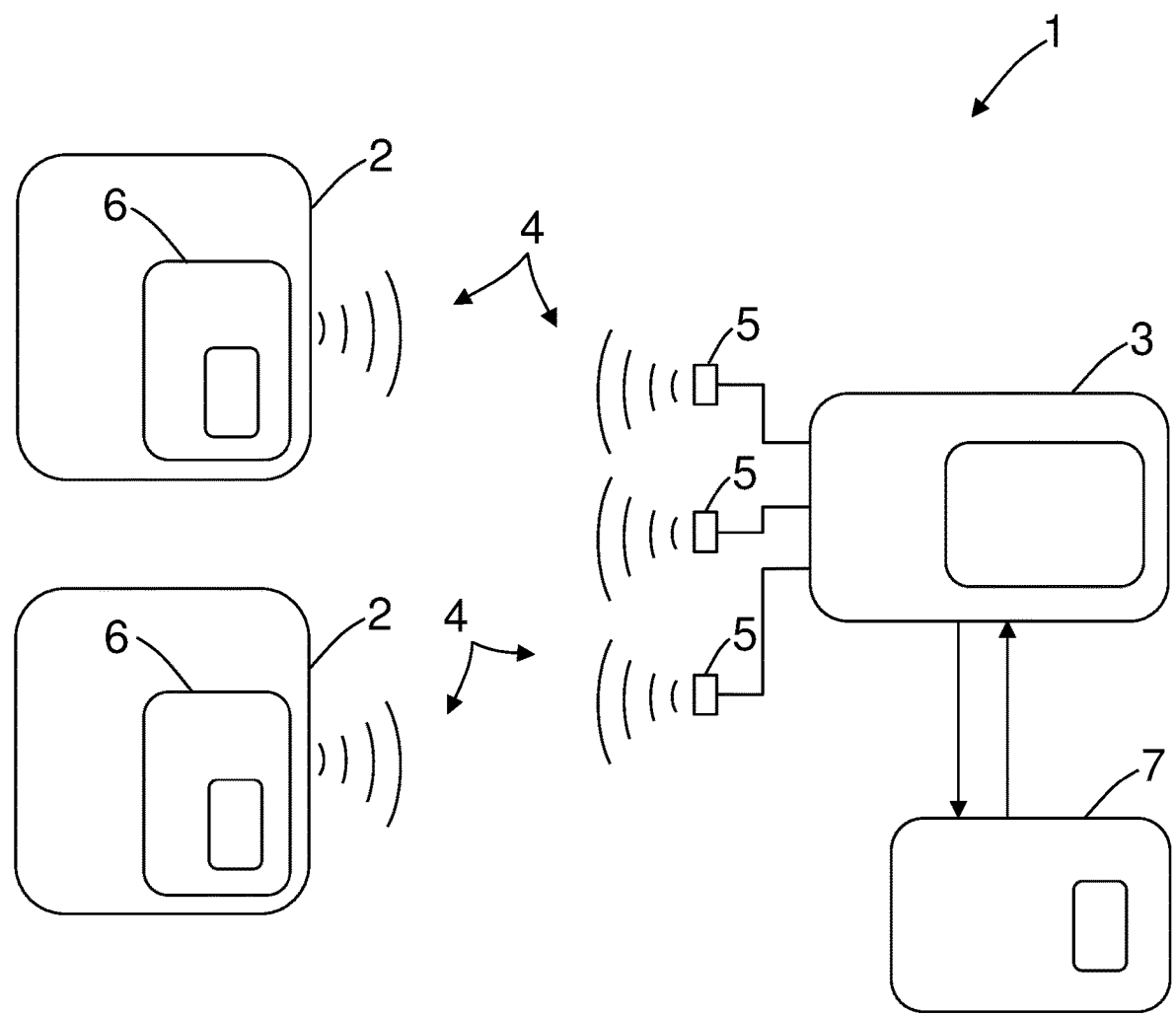

| | | | |
|---|---|---|---|
| 2017/0230801 A1* | 8/2017 | Amsalem | G01S 5/02 |
| 2017/0261595 A1* | 9/2017 | Wu | G01S 7/003 |
| 2017/0270761 A1* | 9/2017 | Jones | H04W 84/00 |
| 2018/0014151 A1* | 1/2018 | Kratz | H04W 4/029 |
| 2019/0097869 A1* | 3/2019 | Saito | H04L 63/1416 |
| 2019/0155278 A1 | 5/2019 | Idbrant et al. | |
| 2019/0162841 A1* | 5/2019 | Peckham | G01S 5/0027 |
| 2019/0180060 A1* | 6/2019 | Mountz | G06K 19/07762 |
| 2019/0277937 A1* | 9/2019 | Li | G01S 5/0236 |
| 2019/0277939 A1* | 9/2019 | Li | G01S 13/878 |
| 2020/0153688 A1* | 5/2020 | Wirola | H04W 64/003 |
| 2020/0228943 A1* | 7/2020 | Martin | H04W 4/80 |
| 2020/0389866 A1* | 12/2020 | Mutz | H04W 64/00 |
| 2020/0408868 A1* | 12/2020 | Eggert | G01P 1/00 |
| 2021/0044935 A1* | 2/2021 | Ottnad | H04W 4/029 |
| 2021/0224492 A1* | 7/2021 | Eisendle | H04W 52/0229 |
| 2021/0327250 A1* | 10/2021 | Waters | B63B 79/40 |
| 2022/0164492 A1* | 5/2022 | Santarone | G06F 30/13 |
| 2022/0210620 A1* | 6/2022 | Wahl | H04B 1/71632 |
| 2022/0390931 A1* | 12/2022 | Haga | G05B 19/4183 |
| 2023/0062514 A1* | 3/2023 | Hladik | G01S 5/0244 |

* cited by examiner

SAFETY SYSTEM AND METHOD USING A SAFETY SYSTEM

The present invention relates to a safety system and to a method using a safety system.

It is the current practice in industrial safety engineering to manage hazards locally at the hazard site in that an approach or a presence of a person is detected and a machine or travel movement is stopped or the movement is slowed down in a safety related manner.

The prior art only describes local safety concepts.

It is an object of the invention to provide an improved safety system.

The object is satisfied by a safety system for localizing at least one object with varying locations, having at least one control and evaluation unit, having at least one radio location system, wherein the radio location system has at least three arranged radio stations, wherein at least one radio transponder is arranged at the object, wherein position data of the radio transponder and thus position data of the object can be determined by means of the radio location system, wherein the position data can be transmitted from the radio station of the radio location system to the control and evaluation unit, wherein the control and evaluation unit is configured to cyclically detect the position data of the radio transponder, wherein a first inspection unit is provided, wherein the first inspection unit is connected to the control and evaluation unit, and wherein the control and evaluation unit is checked by the first inspection unit.

The object is further satisfied by a method using a safety system for localizing at least one object with varying locations, having at least one control and evaluation unit, having at least one radio location system, wherein the radio location system has at least three arranged radio stations, wherein at least one radio transponder is arranged at the object, wherein position data of the radio transponder and thus position data of the object can be determined by means of the radio location system, wherein the position data can be transmitted from the radio station of the radio location system to the control and evaluation unit, wherein the control and evaluation unit is configured to cyclically detect the position data of the radio transponder, wherein a first inspection unit is provided, wherein the first inspection unit is connected to the control and evaluation unit, and wherein the control and evaluation unit is checked by the first inspection unit.

In accordance with the invention, an architecture is present for implementing a safety system, in particular a safe RTLS system. The safety system makes it possible to determine checked position data of objects such as persons and/or mobile machines in an operating environment and to provide them with a degree of plausibility. The checked position data can be used to influence the situation or the objects by the radio transponders such that hazards are avoided.

The safety system comprises at least the radio stations, the control and evaluation unit, the radio transponders, and the first inspection unit.

The radio stations serve the radio-based communication and the time of flight measurement with the radio transponders with varying locations and for forwarding a communication and time of flight measured values to the control and evaluation unit or to the RTLS server.

The control and evaluation unit or a central RTLS server receives the measured signal times of flight and determines position values of the radio transponders present therefrom.

The localization of the radio transponders takes place by time of flight measurements of radio signals that are cyclically exchanged between the radio transponders and a plurality of fixed position radio stations. This triangulation works very well when the signals are transmitted at a sufficient signal strength and on a straight or direct propagation path.

In accordance with the invention, the signals of a radio transponder are received by a plurality of fixed position radio stations or anchor stations and the basis for the localization is created via a time of flight measurement, e.g. the time of arrival (TOA) or e.g. the time difference of arrival (TDOA). The calculation or estimation of the position of a radio transponder then takes place on the control and evaluation unit, for example an RTLS (real time location system) server that is connected to all the radio stations or anchor stations via a wireless or wired data link. This mode of localization is called an RTLS (real time location system) mode.

The first inspection unit or a safe RTLS watchdog controller monitors the control and evaluation unit, with the first inspection unit, for example, validating the determined position data, transmitting switchover signals for a safety status of the individual radio transponders, or initiating inspection unit reset signals to the radio transponders in dependence on the situation, for example.

The first inspection unit and the control and evaluation unit thus form at least one single-channel system with testing in accordance with ISO 13849 or, optionally, a two-channel system. The first inspection unit provides the required diagnostic measures such as are required, for example, by the relevant safety standards.

The first inspection unit or an RTLS watchdog controller serves for the monitoring and diagnosis of the safety system and of the control and evaluation unit and performs safety functions of the safety system. The first inspection unit uses the control and evaluation unit as a communication relay, for example. The first inspection unit, for example, specifically monitors the correct communication between the radio transponders, the radio stations, and the control and evaluation unit, checks the time behavior of all the components, and performs consistency checks on the data determined. The first inspection unit optionally also uses a functional block for this purpose that is performed in the control and evaluation unit or in the RTLS server.

The first inspection unit or the RTLS watchdog controller uses the checked position data of the RTLS system and, for example, information on hazard locations provided in advance by configuration, details of the operating environment, etc. to carry out an evaluation of the local hazards. This is done in the simplest case in that the distances between persons and hazard locations are determined and in that risk reducing measures are initiated on a falling below of s safety limit. A risk reduction is based, for example, on the inspection unit transmitting a safe shutdown or switchover signal to the radio transponders that they, for example, forward to a connected machine or, in the case of a radio transponder on a person, forward a warning signal or action instructions to the person.

A plurality of radio transponders are provided, for example, to all machines and persons of varying locations and optionally also to stationary machines, for example.

The radio transponders can have additional tasks and therefore differ from the conventional radio transponders or tags. The following functions are included, for example, in addition to the localization function:

Radio-based determination of one's own position; for example, an inverse radio location based on flashing light signals of the different radio stations.

Alternatively, a time of flight measurement of the radio station signals can take place by the radio transponder and a feedback of the time of flight differences to the first inspection unit or to the RTLS watchdog controller, according to which a validation of the calculated radio transponder positions takes place.

A transmission of position/status/diagnostic information for example, further takes place to the control and evaluation unit and to the first inspection unit.

To be able to perform these functions, the radio transponders have directional communication, for example, with the first inspection unit.

The invention has the advantage that the higher ranking safety functions can thus be implemented on the basis of safe checked position data.

In a further development of the invention, the position data can be transmitted from the radio transponder to the control and evaluation unit.

At the same time, the position information can thus, however, also be determined on each radio transponder. In this case, the safety system works in a comparable manner as the GPS navigation system. Each radio transponder receives the signals of the radio stations or anchor stations that are transmitted at a fixed time relationship with one another. A position estimate of the radio transponder can also be carried out here via the different time of flight measurements and the knowledge of the radio station positions or anchor positions. The radio transponder itself calculates its position and can transmit it to the RTLS server as required with the aid of the radio signal or of other wireless data links.

The position determination in the GPS mode is independent of the position determination in the RTLS mode in different respects:

- The calculation does not, for example, take place in the control and evaluation unit, but rather locally on a radio transponder.
- The basis for the position calculation is formed by the determined times of flight of the signals of the fired position radio stations. Unlike this, the signals of the radio transponders serve for the time of flight calculation in the RTLS mode.
- The decision on which subset of the radio station signals present are used for the position calculation is made by the radio transponder on the basis of the determined signal quality and the relative radio station positions. A subset of the transmission signals present is thus used. Conversely, in the RTLS mode, use is made of a subset of the signals received at the different radio stations.

This independence of the position determination can now be used to check the localization. If both modes are operated in parallel, i.e. position data are determined both in the RTLS mode and in the GPS mode, a diverse and redundant comparison can then take place for inspection in this manner. The requirement is the merging of both pieces of position information on the control and evaluation unit.

The radio transponders that are attached to persons, vehicles, and/or machines disclose their position in space via the radio location and communicate bidirectionally with the stationary radio stations.

Bidirectional communication is possible, for example, between the radio transponders and the radio stations.

No additional radio technology such as wireless LAN or Bluetooth is required for the communication between the radio stations and the radio transponders.

The first inspection unit checks the plausibility of the determined position data and transmits signals to switch over a safety status of the respective radio transponder on a recognition of errors or implausible measured values.

The RTLS system according to which position data of the radio transponder, and thus position data of the objects, can be determined by means of the radio location system determines the positions of all the radio transponders in a fixed time pattern using radio location. The RTLS system works with bidirectional communication between the radio transponders and the radio stations. This is because the radio transponders can additionally determine their positions themselves and transmit the result of the localization to the control and evaluation unit with the aid of a radio feedback channel, for example a UWB feedback channel. Two independently determined pieces of position information are thereby available for comparison in the control and evaluation unit or in the RTLS server. Namely, first, the position information determined by the radio stations and, second, the position information determined by the radio transponders. Alternatively, time of flight measurements of the signals transmitted by the radio stations can be carried out by the radio transponders and only the determined times of flight can be returned to the control and evaluation unit for validation. This is sufficient for the validation of the position determination. The bidirectional communication can additionally be used to forward diagnostic information or other status information locally determined on the transponders to the watchdog controller.

In a further development of the invention, the radio transponder has a second inspection unit. The second inspection unit likewise carries out a monitoring function. The second inspection unit can also be called a radio transponder watchdog, for example.

In accordance with the further development, the radio transponder has a second inspection unit that has to be reset cyclically via a signal from the first transmission unit. If the signal fails, the second inspection unit triggers a safety signal.

Provision can also be made that the first inspection unit generates an emergency stop signal if a cyclic signal is no longer transmitted by the second inspection unit.

In a further development of the invention, the first inspection unit and/or the second inspection unit respectively has/have a timer.

The timer can be an integral component of the second inspection unit or of the radio transponder that has to be cyclically reset by the first inspection unit. In addition to the transmission of the reset signal, the first inspection unit additionally fixes the time of flight of the timer in dependence on a hazard situation that is present and on a diagnostic status, for example, The timer that can be reset via a reset signal of the first inspection unit elapses in the second inspection units of the radio transponders. The timer of the second inspection units of the radio transponders is dependent, for example, on the distance of the respective radio transponder from a closest person or hazard site, with, in dependence on the distance, a longer time being provided with a larger distance and a shorter time with a smaller distance.

Alternatively or additionally, the timer can also be set in dependence on the plausibility of the position data or in dependence on higher ranking process information. If a robot is, for example, not active as a hazard site the timer time can be extended.

The first inspection unit only resets the timer when the position data are considered valid after a check and if no error status has been detected.

The first inspection unit fixes the times of the different timers in dependence on the minimal time up to the occurrence of a hazard.

In a further development of the invention, the timers of the second inspection units each have an individual time value.

The timers of the second inspection units can be set individually for every radio transponder, for example differently in dependence on the situation.

The integrated timer having an individually settable time value or timer value additionally allows a failsafe implementation and avoidance of problems with a safe radio communication. Complex communication mechanisms for securing the radio communication are thereby dispensed with.

The timer of the second inspection unit of the radio transponder is cyclically reset or set again by the first inspection unit via a reset signal in the normal case when no hazard is present. The timer of the radio transponders can be set individually for every radio transponder, for example differently in dependence on the situation.

If, for example, a large distance has been determined between persons and an autonomous vehicle and if it is known that it would take a plurality of seconds until these persons arrived at a dangerous proximity to the vehicle, the timer can then be set correspondingly long. Conversely, a short value would be set if the persons are already in the proximity of a hazard site or if it has to be assumed due to position data having low reliability that persons are close to hazard sites.

In a further development of the invention, the position data can be transmitted from the radio transponder to the first inspection unit.

The position data are thus independently transmitted from the radio transponders to the control and evaluation unit and to the first inspection unit. The position data are thus present in the control and evaluation unit and in the first inspection unit and can be cross-checked, according to which the first inspection unit checks the position data of the control and evaluation unit and conversely the control and evaluation unit checks the position data of the first inspection unit. A two-channel system is thus present and an independent redundant transmission of the position values from the radio transponders.

In a further development of the invention, the radio transponder has safe switching outputs and/or a safe interface or safety interface.

The radio transponder outputs a safe output signal, in particular to a vehicle or to a machine, via the switch output or via the safety interface. The vehicle is, for example, thereupon braked, slowed, or even stopped. A machine can, for example, thereupon be slowed or likewise stopped.

An output of safety related signals to a vehicle or to the machine takes place via the safe switching outputs or via the safety interface.

The radio transponder having the safe switching output in particular allows a direct effect on the machine and bypasses the necessity of initiating risk reduction measures via a higher ranking machine control.

Instead of switching the safe switching outputs or of outputting a switching signal to the safety interface, provision can also be made that the radio transponder also takes or initiates a different safety measure. E.g. moving a robot arm, for example of a mobile robot, into a safe position. That is a measure of stop category 1 or 2 in accordance with the corresponding standard. In accordance with a stop category 0, there is a "hard" stop of the machine in that e.g. the safe switching outputs switch a relay that interrupts the power supply to specific parts of the machine, e.g. to the motor of a press. Stop category 1 means adopting a "safe" state in a controlled manner, e.g. fast braking a circular saw blade, slowly stopping a movement, and only switching off the power at the end.

With a stop category 2, a power supply is always on to maintain a safe state. E.g. starting the current from an electromagnet to a crane so that a part that hangs at the electromagnet and that the crane transports does not drop down.

The radio transponder preferably has the safety interface, for example, for a stop category 1 and/or 2. This safety interface can, for example, be a bus-based output or, for example, at least one 1 of N outputs or, for example, a radio based interface such as Bluetooth, Bluetooth Low Energy, wireless LAN, etc. to communicate with a control of the machine, a mobile vehicle, on which the radio transponder is located.

In a further development of the invention, the safe switching outputs and/or a safe interface or safety interface Is actuated when a set time of the timer elapses and was not reset.

For example, after the elapse of the timer of the second inspection unit at the safe switching output of the radio transponder, the corresponding status is output, a switching output low signal or an OSSD LOW signal.

In addition to the actively transmitted switching signal, the first inspection unit cyclically sets the timer, for example on the basis of the current situation and the diagnostic status for every radio transponder, said timer also switching the switching output of the radio transponder into the safe state after elapsing without an actively transmitted switching signal of the first inspection unit. It is thus ensured that no hazard can occur even on a breakdown of the communication connection.

Provision is, for example, made that the radio transponder reads time stamps that are contained in the messages of radio transponders and compares them with its own timer. If the difference is greater than a preset value, for example, the radio transponder switches its safe switching outputs or outputs a signal to the safety interface. The minimal and maximal differences between the time stamp and the timers could, for example, be dynamically adapted in ongoing operation in dependence on the location of the radio transponder.

In a further development of the invention, the first inspection unit and/or the second inspection unit is/are respectively configured to check a number and/or a kind of data telegrams of the radio transponder.

In accordance with the further development, the radio transponder does not measure the time per se, but rather the number of data telegrams or data packets and/or the kind of data telegrams. The radio transponder, for example, checks a sum of a specific kind of data telegrams that arrive at the radio transponder within a predetermined time. If, for example, more and/or fewer data telegrams/data packets arrive at the radio transponder within a specific time window than a tolerance allows, the radio transponder recognizes that the data transmission has interference. The radio transponder then takes a safety measure, for example. In the simplest case, the radio transponder switches its safety switching outputs, for example.

The tolerance limits are, for example, dependent on the position of the radio transponder in space or, for example, on the association with a specific locally limited region of a factory floor. I.e. the min. and max. deviations are dynamically adapted in operation, for example, in dependence on the location.

In a further development of the invention, the radio transponder has an output interface for warnings or instructions. The radio transponder is in particular arranged at a person.

The output interface can be configured, for example, to output visual or acoustic warnings or instructions to persons. Display elements or a display are provided for the visual warnings, for example. Acoustic warnings are implemented via signal sounds or also, for example, via a voice output.

In this respect, it can in particular be safety related warnings to a person.

In a further development of the invention, the radio transponders have identification, with a respective radio transponder being associated with a respective object, whereby the control and evaluation unit is configured to distinguish the objects.

For example, first objects are mobile objects and second objects are mobile objects, wherein the radio transponders have identification, wherein a respective radio transponder is associated with a mobile object, whereby the control and evaluation unit is configured to distinguish the mobile objects, and wherein the control and evaluation unit is configured to associate a risk classification with each mobile object at least in dependence on the position of one mobile object with respect to at least one other mobile object.

The mobile object or a movable machine or mobile machine can, for example, be a guideless vehicle, a driverless vehicle, an automated guided vehicle (AGV), automatic mobile robot (AMR), an industrial mobile robot (IMR), or a robot having movable robot arms. The mobile machine thus has a drive and can be moved in different directions.

Furthermore, for example, first objects are persons and second objects are, mobile objects, wherein the radio transponders have identification, wherein a respective radio transponder is associated with at least one person, whereby the control and evaluation unit is configured to distinguish the persons and mobile objects, and wherein the control and evaluation unit is configured to associate a risk classification with each person at least in dependence on the position of one person with respect to at least one mobile object.

In a further development of the invention, the radio transponders are configured to transmit safe control signals to the control and evaluation unit for an initiation of risk reduction measures.

A risk reduction measure can thus be triggered at the control and evaluation unit starting from the radio transponder and thus starting from the object. For example, starting from an object movement and thus starting from a movement of the radio transponder, a risk reduction measure can be initiated, namely, for example, a machine can be stopped, on the basis of a movement of the radio transponder in the direction of the hazardous movement of the machine.

In a further development of the invention, the control and evaluation unit is configured to transmit safe control signals to the radio transponders for an initiation of risk reduction measures to the radio transponders.

Starting from a recognized risk in the safety system, a risk reduction measure can thus be triggered in the radio transponder or in a plurality of or a large number of radio transponders. For example, starting from an object movement and thus starting from a movement of the radio transponder, a risk reduction measure can be initiated, namely, for example, a plurality of vehicles can be slowed or even stopped on the basis of a movement of the radio transponder of a person in the direction of the vehicles.

In a further development of the invention, the radio location system is an ultra wideband radio location system, with the frequency used being in the range from 3.1 GHz to 10.6 GHz, with the transmission energy per radio station amounting to a maximum of 0.5 mW.

An absolute bandwidth in an ultra wideband radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves having a low energy. The system can be used very flexibly and has no interference.

Figure 2:
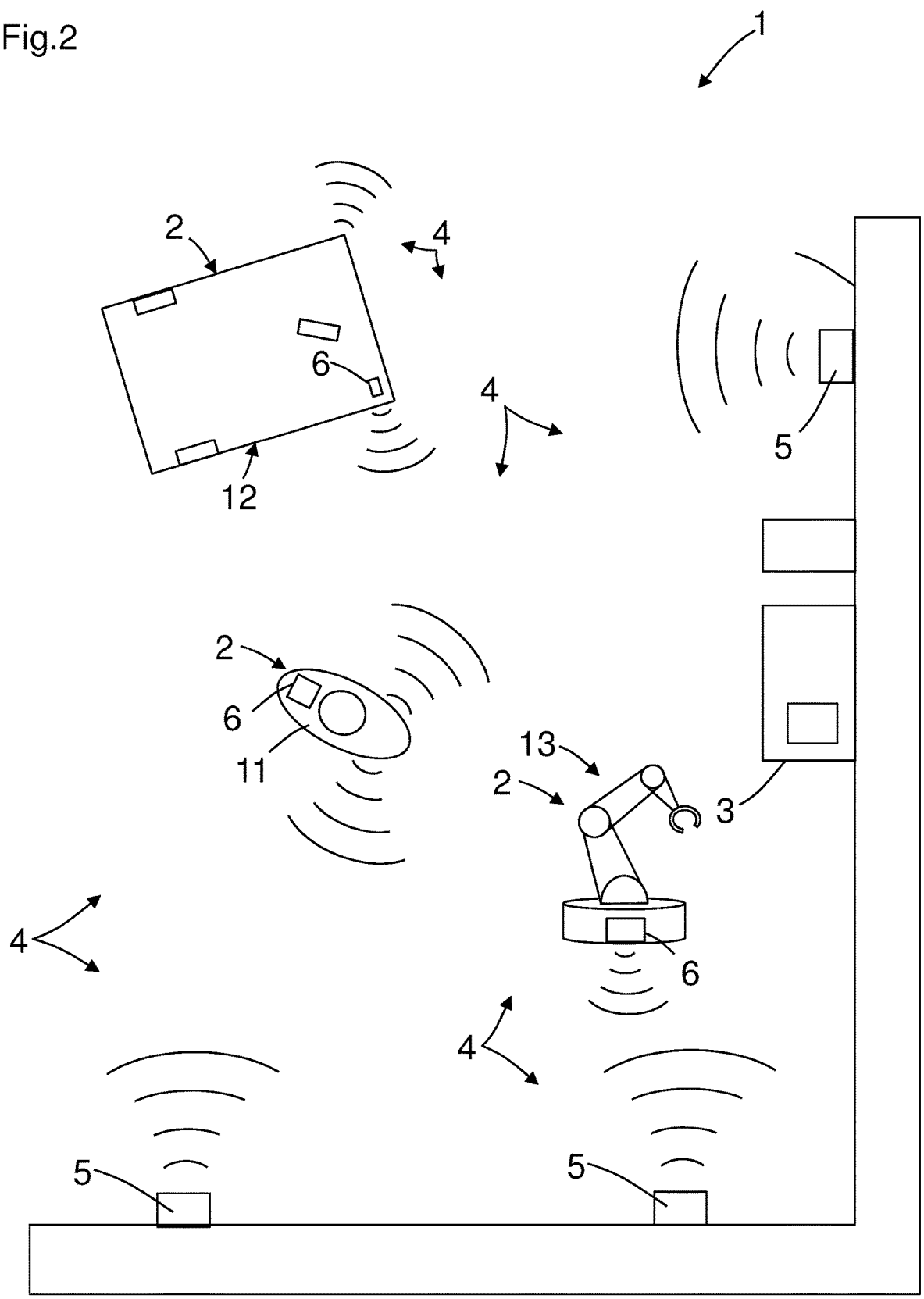
Figure 3:
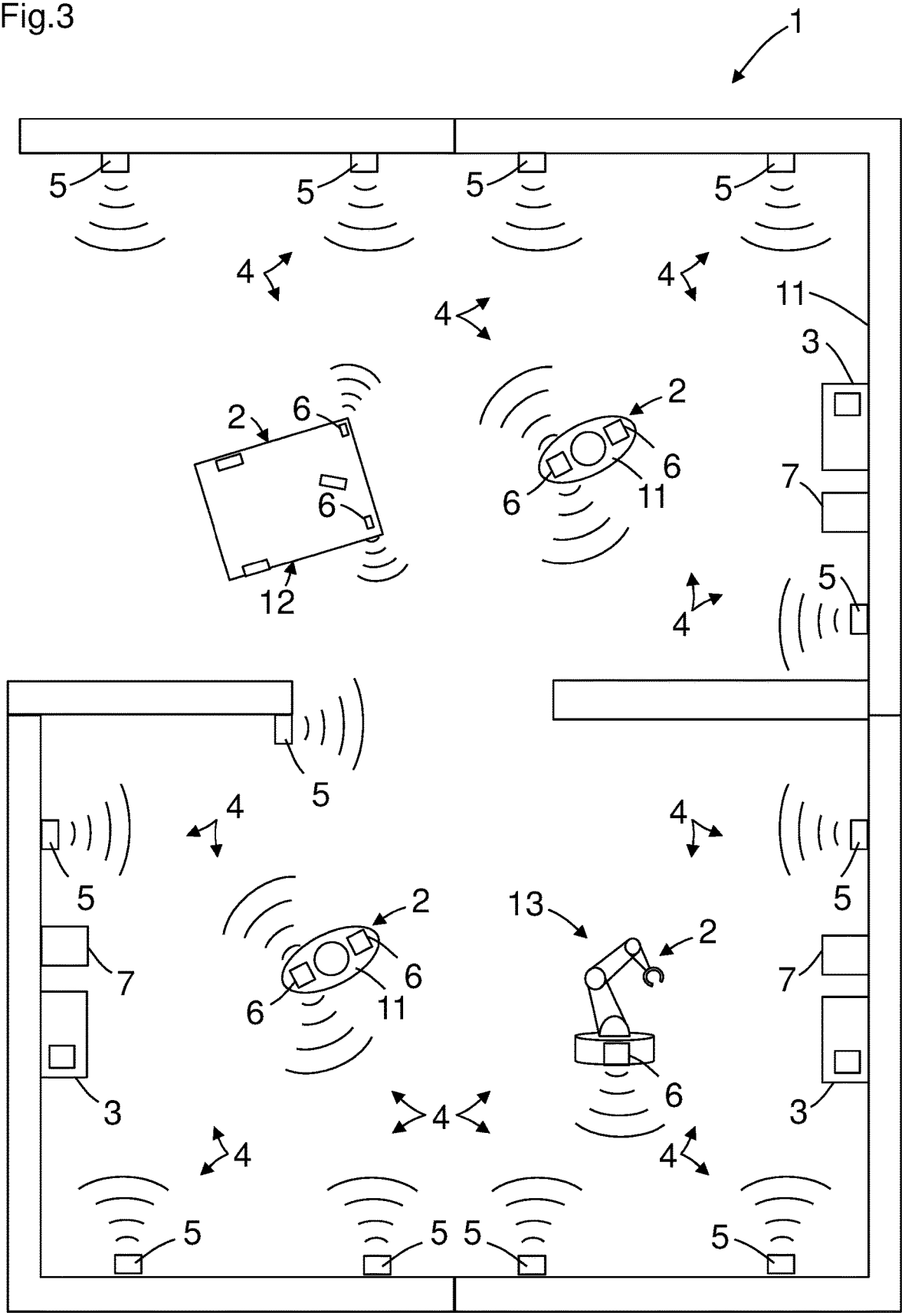
Figure 4:
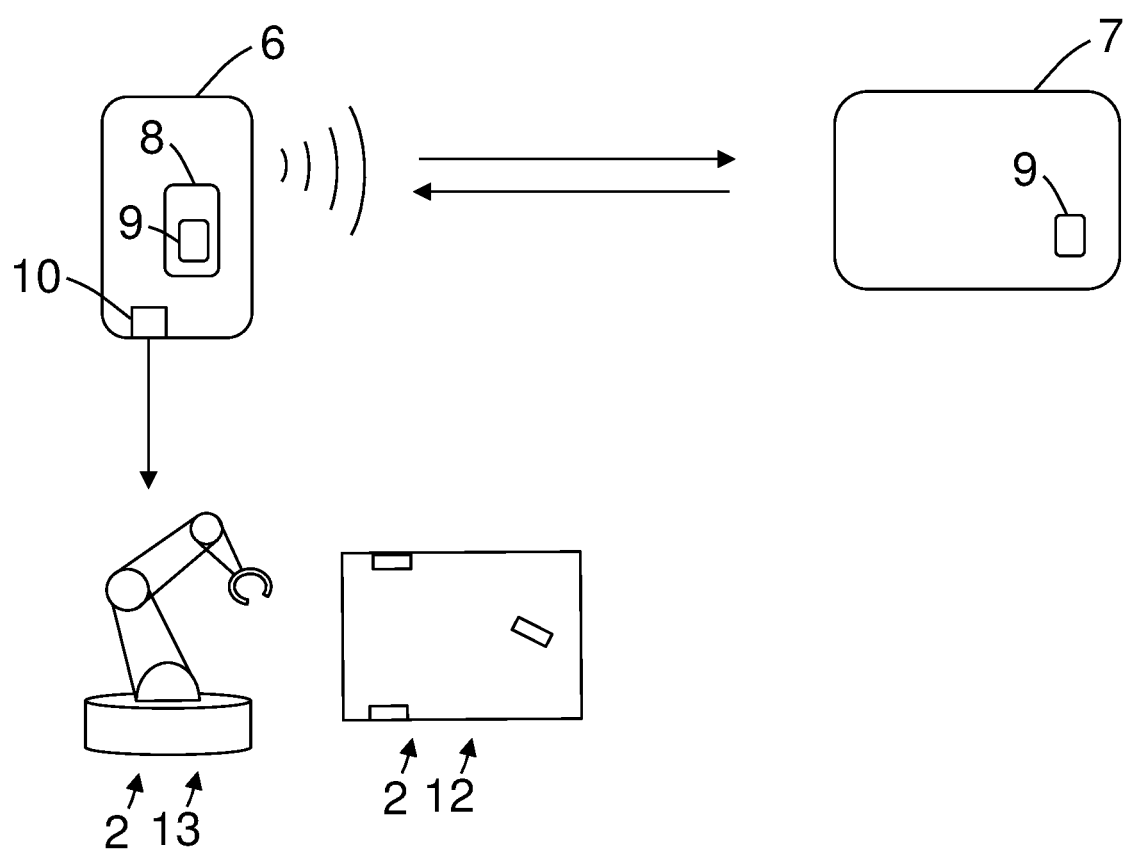
Figure 5:
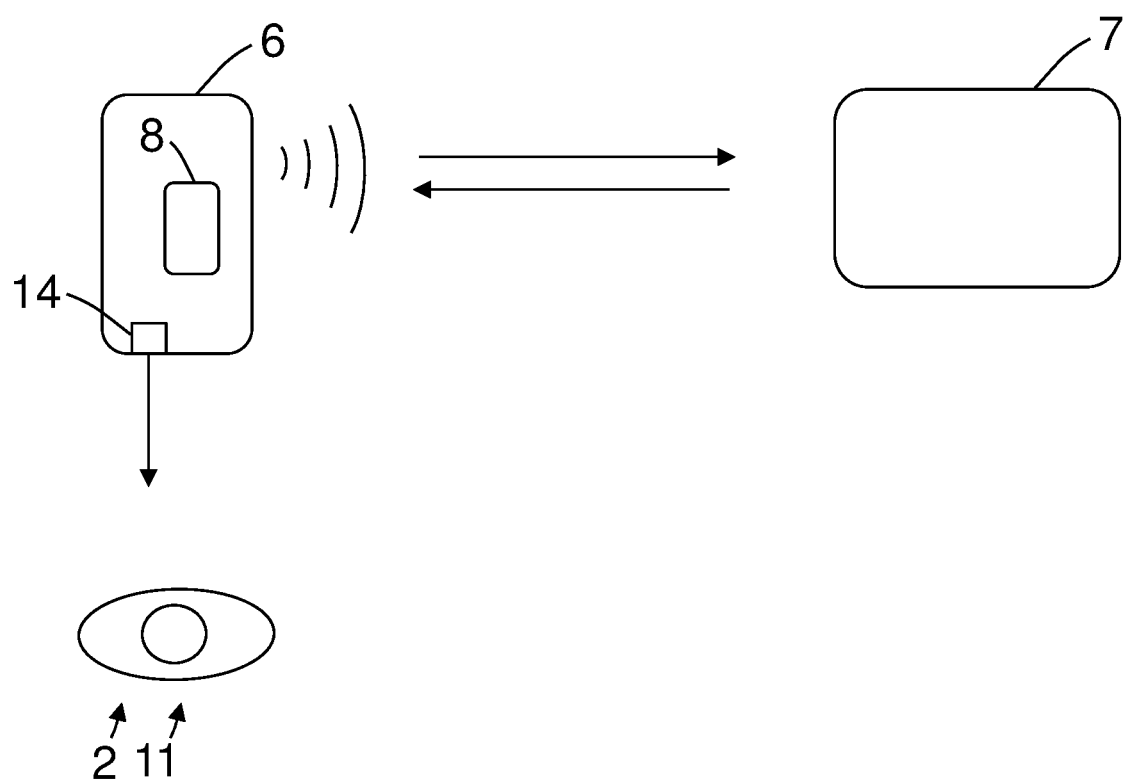

The invention will also be explained in the following with respect to further advantages and features with reference to the enclosed drawing and to embodiments. The Figures of the drawing show in:

FIGS. 1 to 3 respectively a safety system;
FIGS. 4 to 5 respectively a part of a safety system.

In the following Figures, identical parts are provided with identical reference numerals.

FIG. 1 shows a safety system 1 for localizing at least one object 2 with varying locations, having at least one control and evaluation unit 3, and having at least one radio location system 4, wherein the radio location system 4 has at least three arranged radio stations 5, wherein at least one radio transponder 6 is arranged at the object 2, wherein position data of the radio transponder 6 and thus position data of the object 2 can be determined by means of the radio location system 4, wherein the position data can be transmitted from the radio station 5 of the radio location system 4 to the control and evaluation unit 3 and/or the position data can be transmitted from the radio transponder 6 to the control and evaluation unit 3, wherein the control and evaluation unit 3 is configured to cyclically detect the position data of the radio transponder 6, wherein a first inspection unit 7 is provided, wherein the first inspection unit 7 is connected to the control and evaluation unit 3, and wherein the control and evaluation unit 3 is checked by the first inspection unit 7.

The safety system 1 in accordance with FIG. 2 makes it possible to determine checked position data of objects 2 such as persons 11 and mobile machines 12 in an operating environment and to provide them with a degree of plausibility. The checked position data can be used to influence the situation or the objects 2 by the radio transponders 6 such that hazards are avoided.

The safety system 1 in accordance with FIG. 1 comprises at least the radio stations 5, the control and evaluation unit 3, the radio transponders 6, and the first inspection unit 7.

The radio stations 5 serve the radio-based communication and the time of flight measurement with the radio transponders 6 with varying locations and for forwarding communication and time of flight measured values to the control and evaluation unit 3 or to the RTLS server.

The control and evaluation unit 3 or a central RTLS server receives the measured time of flight signals and determines position values of the radio transponders 6 present therefrom.

The localization of the radio transponders 6 takes place by time of flight measurements of radio signals that are cyclically exchanged between the radio transponders 6 and a plurality of fixed position radio stations 5.

In accordance with FIG. 1, the signals of a radio transponder 2 are received by a plurality of fixed position radio stations 5 or anchor stations and the basis for the localization is created via a time of flight measurement, e.g. the time of arrival (TOA) or e.g. the time difference of arrival (TDOA). The calculation or estimation of the position of a radio transponder 6 then takes place on the control and evaluation unit 3, for example a central RTLS (real time location system) server that is connected to all the radio stations 5 or anchor stations via a wireless or wired data link. This mode of localization is called an RTLS (real time location system) mode.

At the same time, the position information can, however, also be determined on each radio transponder 6. In this case, the safety system 1 works in a comparable manner as the GPS navigation system. Each radio transponder 6 receives the signals of the radio stations 5 or anchor stations that are transmitted at a fixed time relationship with one another. A position estimate of the radio transponders 6 can also be carried out here via the different time of flight measurements and the knowledge of the radio station positions or anchor positions. The radio transponder 6 itself calculates its position and can transmit it to the control and evaluation unit 3 or to the RTLS server as required with the aid of the radio transponder or of other wireless data links.

This independence of the position determination can now be used to check the localization. If both modes are operated in parallel., i.e. position data are determined both in the RTLS mode and in the GPS mode, a diverse and redundant comparison can then take place for verification in this manner. The requirement is the merging of both pieces of position information on the control and evaluation unit 3.

The first inspection unit 7 or a safe RTLS watchdog controller monitors the control and evaluation unit 3, with the first inspection unit 7, for example, validating the determined position data, transmitting switchover signals for a safety status of the individual radio transponders 6, or initiating inspection unit reset signals to the radio transponders 6 in dependence on the situation, for example.

The first inspection unit 7 and the control and evaluation unit 3 thus form a two-channel system.

The radio transponders 6 that are attached to persons 11, vehicles 12, and/or machines 13 in accordance with FIG. 2 or FIG. 3 disclose their positions in space via the radio location and communicate bidirectionally with the stationary radio stations 5.

Bidirectional communication is possible, for example, between the radio transponders 6 and the radio stations 5.

No additional radio technology such as wireless LAN or Bluetooth is required for the communication between the radio stations 5 and the radio transponders 6.

The first inspection unit 7 checks the plausibility of the determined position data and transmits signals to switch over a safety status of the respective radio transponder 6 on a recognition of errors or implausible measured values.

The RTLS system, according to which position data of the radio transponder 6, and thus position data of the objects 2, can be determined by means of the radio location system 4, determines the positions of all the radio transponders 6 in a fixed time pattern using radio location in a fixed time pattern. The RTLS system works with bidirectional communication between the radio transponders 6 and the radio stations 5.

The first inspection unit 7 or an RTLS watchdog controller serves for the monitoring and diagnosis of the safety system 1 and of the control and evaluation unit 3 and performs safety functions of the safety system 1. The first inspection unit 7 uses the control and evaluation unit 3 as a communication relay. The first inspection unit 7, for example, specifically monitors the correct communication between the radio transponders 6, the radio stations 5, and the control and evaluation unit 3, checks the time behavior of all the components, and performs consistency checks on the data determined. The first inspection unit 7 optionally also uses a functional block for this purpose that is performed in the control and evaluation unit 3 or in the RTLS server.

The first inspection unit 7 or the RTLS watchdog controller uses the checked position data of the RTLS system and, for example, information on hazard locations provided in advance by configuration, details of the operating environment, etc. to carry out an evaluation of the local hazards. This is done in the simplest case in that the distances between persons 11 and hazard sites are determined and in that risk reducing measures are initiated on a falling below of a safety limit.

A risk reduction is based, for example in accordance with FIG. 4, on the inspection unit 7 transmitting a safe shutdown or switchover signal to the radio transponders 6 that they, for example, forward to a connected machine 13 or, in the case of a radio transponder 6 in accordance with FIG. 5 on a person 2, forward a warning signal or action instructions to the person 2.

In accordance with FIG. 2 and FIG. 3, for example a plurality of radio transponders 6 are provided, for example, at all machines 12 and persons 13 of varying locations and optionally also at stationary machines.

The radio transponders 6 can have additional tasks and therefore differ from the conventional radio transponders or tags. The following functions are included, for example, in addition to the localization function of the RTLS system:

Radio-based determination of one's own position; for example, an inverse radio location based on flashing light signals of the different radio stations 5.

Alternatively, a time of flight measurement of the radio station signals can take place by the radio transponder 6 and a feedback of the time of flight differences to the first inspection unit 7 or to the RTLS watchdog controller, according to which a validation of the calculated radio transponder positions takes place.

A transmission of position/status/diagnostic information for example, further takes place to the control and evaluation unit 3 and to the first inspection unit 7.

To be able to perform these functions, the radio transponders 6 have directional communication, for example, with the first inspection unit 7.

In accordance with FIG. 4, the radio transponder has a second inspection unit 8. The second inspection unit 8 likewise carries out a monitoring function. The second inspection unit 8 can also be called a radio transponder watchdog, for example.

The radio transponder 6 has a second inspection unit 8 that has to be reset cyclically via a signal from the first inspection unit 7. If the signal fails, the second inspection unit 8 triggers a safety signal.

Provision can also be made that the first inspection unit 7 generates an emergency stop signal if a cyclic signal is no longer transmitted by the second inspection unit 8.

In accordance with FIG. 4, the inspection units 7 and 8 each have a timer 9.

The timer 9 can be an integral component of the second inspection unit 7 or 8 or of the radio transponder 6 that has to be cyclically reset by the first inspection unit 7. In addition to the transmission of the reset signal, the first inspection unit 7 additionally fixes the time of flight of the timer in dependence on a hazard situation that is present and on a diagnostic status, for example, The timer that can be reset via a reset signal of the first inspection unit 7 elapses in the second inspection unit 8 of the radio transponder 6. The timer 9 of the second inspection unit 8 of the radio transponder 6 is dependent, for example, on the distance of the respective radio transponder 6 from a closest person in accordance with FIG. 5 or hazard site in accordance with FIG. 4, with, in dependence on the distance, a longer time being provided with a larger distance and a shorter time with a smaller distance.

The first inspection unit 7 only resets the timer 9 when the position data are considered valid after a check and if no error status has been detected.

The first inspection unit 7 fixes the times of the different timers 9 in dependence on the minimal time up to the occurrence of a hazard.

The timers 9 of the second inspection units 8 each have an individual time value, for example.

The timers 9 of the second inspection units 8 can be set individually for every radio transponder 6, for example differently in dependence on the situation.

The integrated timer 9 having an individually settable time value or timer value additionally allows a failsafe implementation and avoidance of problems with a safe radio communication. Complex communication mechanisms for securing the radio communication are thereby dispensed with.

The timer 9 of the second inspection unit 8 of the radio transponder 6 is cyclically reset or set again by the first inspection unit via a reset signal in the normal case when no hazard is present. The timer 9 of the radio transponders 6 can be set individually for every radio transponder 6, for example differently in dependence on the situation.

If, for example, a large distance has been determined between persons 11 and an autonomous vehicle 12 and if it is known that it would take a plurality of seconds until these persons 11 arrived at a dangerous proximity to the vehicle 12, the timer 9 can then be set correspondingly long. Conversely, a short value would be set if the persons 11 are already in the proximity of a hazard site or if it has to be assumed due to position data having low reliability that persons 11 are close to hazard sites.

In accordance with FIG. 4, the position data can be transmitted from the radio transponder 6 to the first inspection unit 7.

The position data are thus independently transmitted from the radio transponders 6 to the control and evaluation unit 3 and to the first inspection unit 7. The position data are thus present in the control and evaluation unit 3 and in the first inspection unit 7 and can be cross-checked, according to which the first inspection unit 7 checks the position data of the control and evaluation unit 3 and conversely the control and evaluation unit 3 checks the position data of the first inspection unit 7. A two-channel system is thus present and an independent redundant transmission of the position values from the radio transponders 6.

In accordance with FIG. 4, the radio transponder 6 has safe switch outputs 10 or a safety interface.

The radio transponder 6 outputs a safe output signal, in particular to a vehicle 12 or to a machine 13, via the switch output 10 or via the safety interface. The vehicle 12 is, for example, thereupon braked, slowed, or even stopped. A machine 13 can, for example, thereupon be slowed or likewise stopped.

An output of safety related signals to an object 12, in particular to a vehicle 12 or to the machine 13, takes place via the safe switching outputs 10 or via the safety interface.

The radio transponder 6 having the safe switching output 10 in particular allows a direct effect on the machine 13 and bypasses the necessity of initiating risk reduction measures via a higher ranking machine control.

The corresponding status is output to the safe switching output 10 of the radio transponder 6, for example after the elapse of the timer 9 of the second inspection unit 8.

In addition to the actively transmitted switching signal, the first inspection unit 7 cyclically sets the timer 9, for example on the basis of the current situation and the diagnostic status for every radio transponder 6, said timer 9 also switching the switching output 10 of the radio transponder 6 into the safe state after elapsing without an actively transmitted switching signal of the first inspection unit 7. It is thus ensured that no hazard can occur even on a breakdown of the communication connection.

In accordance with FIG. 5, the radio transponder 6 has an output interface 14 for warnings or instructions. The radio transponder 6 is in particular arranged at a person 11.

The output interface 14 can be configured, for example, to output visual or acoustic warnings or instructions to persons 11. Display elements or a display are provided for the visual warnings, for example. Acoustic warnings are implemented via signal sounds or also, for example, via a voice output.

In this respect, it can in particular be safety related warnings to the person 11.

The radio transponders 6, for example, have identification, with a respective radio transponder 6 being associated with a respective object, whereby the control and evaluation unit 3 is configured to distinguish the objects 2.

For example, first objects 2 are mobile objects and second objects 2 are mobile objects, wherein the radio transponders 6 have identification, wherein a respective radio transponder 6 is associated with a mobile object, whereby the control and evaluation unit 3 is configured to distinguish the mobile objects, and wherein the control and evaluation unit 3 is configured to associate a risk classification with each mobile object at least in dependence on the position of one mobile object with respect to at least one other mobile object.

The mobile object or a movable machine or mobile machine 12 can, for example, be a guideless vehicle, a driverless vehicle, an automated guided vehicle (AGV), automatic mobile robot (AMR), an industrial mobile robot (IMR), or a robot having movable robot arms. The mobile machine thus has a drive and can be moved in different directions.

Furthermore, for example, first objects are persons 11 and second objects are mobile objects, wherein the radio transponders 6 have identification, wherein a respective radio transponder 6 is associated with at least one person 11, and a respective radio transponder 6 is associated with at least one mobile object, whereby the control and evaluation unit 3 is configured to distinguish the persons 11 and mobile objects, and wherein the control and evaluation unit 3 is configured to associate a risk classification with each person 11 at least in dependence on the position of one person 11 with respect to at least one mobile object.

In accordance with FIG. 4, the radio transponders are 6 configured to transmit safe control signals to the control and evaluation unit 3 for an initiation of risk reduction measures.

A risk reduction measure can thus be triggered at the control and evaluation unit 3 starting from the radio transponder 6 and thus starting from the object 2. For example, starting from an object movement and thus starting from a movement of the radio transponder 6, a risk reduction measure can be initiated, namely, for example, a machine 13 can be stopped, on the basis of a movement of the radio transponder 6 in the direction of the hazardous movement of the machine 13.

In accordance with FIG. 4, the control and evaluation unit 3 is configured to transmit safe control signals to the radio transponder 6 for an initiation of risk reduction measures.

Starting from a recognized risk in the safety system, a risk reduction measure can thus be triggered in the radio transponder 6 or in a plurality of or a large number of radio transponders 6. For example, starting from an object movement and thus starting from a movement of the radio transponder 6, a risk reduction measure can be initiated, namely, for example, a plurality of vehicles 12 can be slowed or even stopped on the basis of a movement of the radio transponder 6 of a person 11 in the direction of the vehicles 12.

The radio location system 4, for example, is an ultra wideband radio location system, with the frequency used being in the range from 3.1 GHz to 10.6 GHz, with the transmission energy amounting to a maximum of 0.5 mW per radio station.

REFERENCE NUMERALS

1 safety system
2 objects
3 control and evaluation unit
4 radio location system
5 radio stations
6 radio transponder
7 first inspection unit
8 second inspection unit
9 timer
10 safe switching outputs
11 persons
12 mobile machine, vehicles
13 machine
14 output interface

The invention claimed is:

1. A safety system for localizing at least one object with varying locations, the safety system having at least one control and evaluation unit, and at least one radio location system,
   wherein the at least one radio location system has at least three arranged radio stations;
   wherein at least one radio transponder is arranged at the at least one object;
   wherein position data of the at least one radio transponder and the object is determined by the at least one radio location system;
   wherein the position data is transmitted from the at least three radio stations of the at least one radio location system to the at least one control and evaluation unit;
   wherein the control and evaluation unit is configured to cyclically detect the position data of the at least one radio transponder;
   wherein the safety system further comprises a first inspection unit connected to the control and evaluation unit, the control and evaluation unit being monitored by the first inspection unit, and
   wherein the at least one radio transponder comprises at least one second inspection unit, the at least one second inspection unit being cyclically reset by a signal from the first inspection unit.

2. The safety system in accordance with claim 1, wherein the position data can be transmitted from the at least one radio transponder to the at least one control and evaluation unit.

3. The safety system in accordance with claim 1, wherein at least one of the first inspection unit and the at least one second inspection unit has a timer.

4. The safety system in accordance with claim 3, wherein the at least one second inspection unit comprises a plurality of second inspection units each having the timer, wherein each of timers of the plurality of second inspection units has an individual time value.

5. The safety system in accordance with claim 1, wherein the position data is transmitted from the at least one radio transponder to the first inspection unit.

6. The safety system in accordance with claim 1, wherein the at least one radio transponder has at least one of safe switching outputs and a safe interface.

7. The safety system in accordance with claim 6, wherein at least one of the safe switching outputs and the safe interface is actuated when a set time of a timer elapses and is not reset.

8. The safety system in accordance with claim 1, wherein at least one of the first inspection unit and the at least one second inspection unit is configured to check at least one of a number and a kind of data telegrams of the at least one radio transponder.

9. The safety system in accordance with claim 1, wherein the at least one radio transponder has an output interface for warnings or instructions.

10. The safety system in accordance with claim 1, wherein the at least one radio transponder comprises a plurality of radio transponders, wherein the at least one object comprises a plurality of objects, wherein each of the radio transponders has unique identification, with a respective one of the radio transponders being associated with a respective one of the objects, whereby the control and evaluation unit is configured to distinguish between the objects.

11. The safety system in accordance with claim 1, wherein the at least one radio transponder is configured to transmit safe control signals for an initiation of risk reduction measures to the control and evaluation unit.

12. The safety system in accordance with claim 1, wherein the control and evaluation unit is configured to transmit safe control signals for an initiation of risk reduction measures to the at least one radio transponder.

13. The safety system in accordance with claim 1, wherein the at least one radio location system is an ultra wideband radio location system, with a frequency thereof being in the range from 3.1 GHz to 10.6 GHZ, with a transmission energy thereof having a maximum of 0.5 mW.

14. The safety system in accordance with claim 1, wherein the first inspection unit is configured to perform monitoring functions selected from the group consisting of validating the position data, transmitting at least one switchover signal for a safety status of the at least one radio transponders, initiating at least one inspection unit reset signal to the at least one radio transponder, and combinations thereof.

15. A method for localizing at least one object with varying locations using a safety system, the safety system having at least one control and evaluation unit and at least one radio location system, wherein the at least one radio location system has at least three arranged radio stations, the method comprising:
   arranging at least one radio transponder at the at least one object;

determining position data of the at least one radio transponder and the at least one object using the at least one radio location system;

transmitting the position data from the at least three radio stations of the at least one radio location system to the control and evaluation unit, wherein the control and evaluation unit cyclically detects the position data of the at least one radio transponder; and monitoring the control and evaluation unit with a first inspection unit connected to the control and evaluation unit, wherein the at least one radio transponder comprises at least one second inspection unit, the at least one second inspection unit being cyclically reset by a signal from the first inspection unit.

16. The method in accordance with claim 15, wherein the first inspection unit performs monitoring functions selected from the group consisting of validating the position data, transmitting at least one switchover signal for a safety status of the at least one radio transponders, initiating at least one inspection unit reset signal to the at least one radio transponder, and combinations thereof.

* * * * *